US012097862B2

(12) United States Patent
Rajab et al.

(10) Patent No.: US 12,097,862 B2
(45) Date of Patent: Sep. 24, 2024

(54) SYSTEM AND METHOD FOR AUTOMATED MERGING

(71) Applicants: Honda Motor Co., Ltd., Tokyo (JP); Virginia Tech Intellectual Properties, Inc., Blacksburg, VA (US)

(72) Inventors: Samer Rajab, Novi, MI (US); Shigenobu Saigusa, West Bloomfield, MI (US); Paritosh Kelkar, Dearborn, MI (US); Yasir Khudhair Al-Nadawi, Ann Arbor, MI (US); Yusen Chen, Ann Arbor, MI (US); Tyler Naes, Farmington, MI (US); James Schultz, Danville, VA (US); Cameron Rainey, Stevensville, MD (US); Steven Huggins, Danville, VA (US); Shane Mclaughlin, Blacksburg, VA (US); Kevin Kefauver, Elon, NC (US)

(73) Assignees: HONDA MOTOR CO., LTD., Tokyo (JP); VIRGINIA TECH INTELLECTUAL PROPERTIES, INC., Blacksburg, VA (US)

(*) Notice: Subject to any disclaimer, the term of this patent is extended or adjusted under 35 U.S.C. 154(b) by 110 days.

(21) Appl. No.: 17/477,729

(22) Filed: Sep. 17, 2021

(65) Prior Publication Data
US 2023/0091276 A1 Mar. 23, 2023

(51) Int. Cl.
*B60W 40/09* (2012.01)
*B60W 40/10* (2012.01)

(52) U.S. Cl.
CPC .......... *B60W 40/09* (2013.01); *B60W 40/10* (2013.01); *B60W 2554/4045* (2020.02); *B60W 2554/4046* (2020.02); *B60W 2554/4049* (2020.02)

(58) Field of Classification Search
CPC ............ G08G 1/167; B60W 30/16; B60W 30/18163; B60W 40/09; B60W 40/10;
(Continued)

(56) References Cited

U.S. PATENT DOCUMENTS 7,516,041 B2  4/2009  Smartt et al.
9,669,828 B2  6/2017  Caveney et al.
(Continued)

FOREIGN PATENT DOCUMENTS

CN    102194312      9/2011
JP    2012118870 A  * 6/2012

OTHER PUBLICATIONS

Brackstone, M., Sultan, B., and McDonald, M. (2002). Motorway driver behaviour: studies on car following. In Transportation Research Part F (pp. 329-344).
(Continued)

*Primary Examiner* — Peter D Nolan
*Assistant Examiner* — Ce Li Li
(74) *Attorney, Agent, or Firm* — RANKIN, HILL & CLARK LLP

(57) ABSTRACT

A system and method for controlling a merge vehicle travelling along a highway having a merge lane and a main lane. The method includes receiving merge data about the merge vehicle and a surrounding environment of the merge vehicle. The method includes detecting an intent to perform a merge maneuver by the merge vehicle from the merge lane to the main lane based on the merge data. Further, the method includes generating a graph having a plurality of nodes connected by edges. The plurality of nodes includes a start node set to a current position of the merge vehicle and a goal node located in the main lane after the merge lane has ended. The method includes calculating a three-dimensional (3D) trajectory based on the graph by optimizing edge costs
(Continued)

from the start node to the goal node, and controlling the merge vehicle based on the 3D trajectory.

19 Claims, 13 Drawing Sheets

(58) Field of Classification Search
CPC ......... B60W 60/0011; B60W 60/0023; B60W 2554/4042; B60W 2554/4045; B60W 2554/4046; B60W 2554/4049; B60W 2554/802
See application file for complete search history.

(56) References Cited

U.S. PATENT DOCUMENTS

| | | | |
|---|---|---|---|
| 10,262,215 B2 | 4/2019 | Yoshihira et al. | |
| 10,514,263 B2 | 12/2019 | Maru et al. | |
| 2005/0015203 A1 | 1/2005 | Nishira | |
| 2014/0129073 A1* | 5/2014 | Ferguson | B60W 30/18163 701/23 |
| 2017/0314947 A1* | 11/2017 | Lee | G01C 21/3617 |
| 2018/0042066 A1* | 2/2018 | Kremo | G01S 13/86 |
| 2019/0310100 A1 | 10/2019 | Yang | |
| 2020/0042013 A1 | 2/2020 | Kelkar et al. | |
| 2020/0249685 A1* | 8/2020 | Elluswamy | G06T 7/20 |
| 2020/0307589 A1* | 10/2020 | Li | B60W 60/0023 |
| 2021/0039714 A1* | 2/2021 | Huq | B62D 6/00 |
| 2022/0107201 A1* | 4/2022 | Yagyu | G01C 21/3632 |
| 2022/0130253 A1* | 4/2022 | Balmaceda | G08G 1/0967 |
| 2022/0212671 A1* | 7/2022 | Chen | B60W 60/001 |
| 2022/0297696 A1* | 9/2022 | Mahajan | B60W 30/18163 |

OTHER PUBLICATIONS

Coulter, R. (1992). Implementation of the Pure Pursuit Path Tracking Algorithm. PA: Carnegie Mellon Institute.

Hankey, J. M., Perez, M. A., and McClafferty, J. A. (2016). Description of the SHRP2 Naturalistic Database and the Crash, Near-Crash, and Baseline Data Sets. Retrieved from https://vtechworks.lib.vt.edu/handle/10919/70850.

National Academies of Sciences, Engineering, and Medicine (2015). Naturalistic Driving Study: Linking the Study Data to the Roadway Information Database. Washington, DC: The National Academies Press. Retrieved from https://doi.org/10.17226/22200.

\* cited by examiner

US 12,097,862 B2

SYSTEM AND METHOD FOR AUTOMATED MERGING

BACKGROUND

Merging roadways are one of the primary sources for highway congestion and accidents. This is because merging is one of the most dynamic vehicle driving scenario. Drivers have to constantly assess and make predictions to execute some of the most critical maneuvers that are performed during normal driving. Connected and automated vehicles along with intelligent transportation infrastructures are increasingly being utilized to develop approaches for improving traffic flow at merging roadways. A foundation of these approaches is trajectory planning. Finding the most suitable trajectory that does not disrupt the traffic flow while using inputs that are comfortable for passengers is challenging.

BRIEF DESCRIPTION

According to one aspect, a method for controlling a merge vehicle travelling along a highway having a merge lane and a main lane. The method includes receiving merge data about the merge vehicle and a surrounding environment of the merge vehicle. The method includes detecting an intent to perform a merge maneuver by the merge vehicle from the merge lane to the main lane based on the merge data. Further, the method includes generating a graph having a plurality of nodes connected by edges. The plurality of nodes includes a start node set to a current position of the merge vehicle and a goal node located in the main lane after the merge lane has ended. The method includes calculating a three-dimensional (3D) trajectory based on the graph by optimizing edge costs from the start node to the goal node, and controlling the merge vehicle based on the 3D trajectory.

According to another aspect, a system for controlling a merge vehicle travelling along a highway having a merge lane and a main lane includes a plurality of sensors for capturing merge data about the merge vehicle and a surrounding environment of the merge vehicle. The surrounding environment of the merge vehicle includes the merge lane, the main lane, and one or more traffic actors. The system also includes a processor operatively connected for computer communication with the plurality of sensors. The processor detects an intent to perform a merge maneuver by the merge vehicle from the merge lane to the main lane based on the merge data. The processor generates a graph having a plurality of nodes connected by edges. The plurality of nodes includes a start node set to a current position of the merge vehicle and a goal node located in the main lane after the merge lane has ended. The processor also calculates a three-dimensional (3D) trajectory based on the graph by optimizing edge costs from the start node to the goal node. Further, the processor transmits the 3D trajectory to the merge vehicle thereby controlling the merge vehicle to perform the merge maneuver according to the 3D trajectory.

According to a further aspect, a non-transitory computer-readable storage medium including instructions that when executed by a processor, cause the processor to receive merge data about a merge vehicle and a surrounding environment of the merge vehicle. The surrounding environment of the merge vehicle includes a merge lane, a main lane, and one or more traffic actors. The instructions further causing the processor detect an intent to perform a merge maneuver by the merge vehicle from the merge lane to the main lane based on the merge data, and generate a graph having a plurality of nodes connected by edges. The plurality of nodes includes a start node set to the current position of the merge vehicle and a goal node located in the main lane after the merge lane has ended. The instructions also causing the processor to calculate a three-dimensional (3D) trajectory based on the graph by optimizing edge costs from the start node to the goal node, and communicate motion control signals to the merge vehicle based on the 3D trajectory

BRIEF DESCRIPTION OF THE DRAWINGS

The accompanying drawings, which are incorporated in and constitute a part of the specification, illustrate various systems, methods, devices, and other embodiments of the disclosure. It will be appreciated that the illustrated element boundaries (e.g., boxes, groups of boxes, directional lines, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
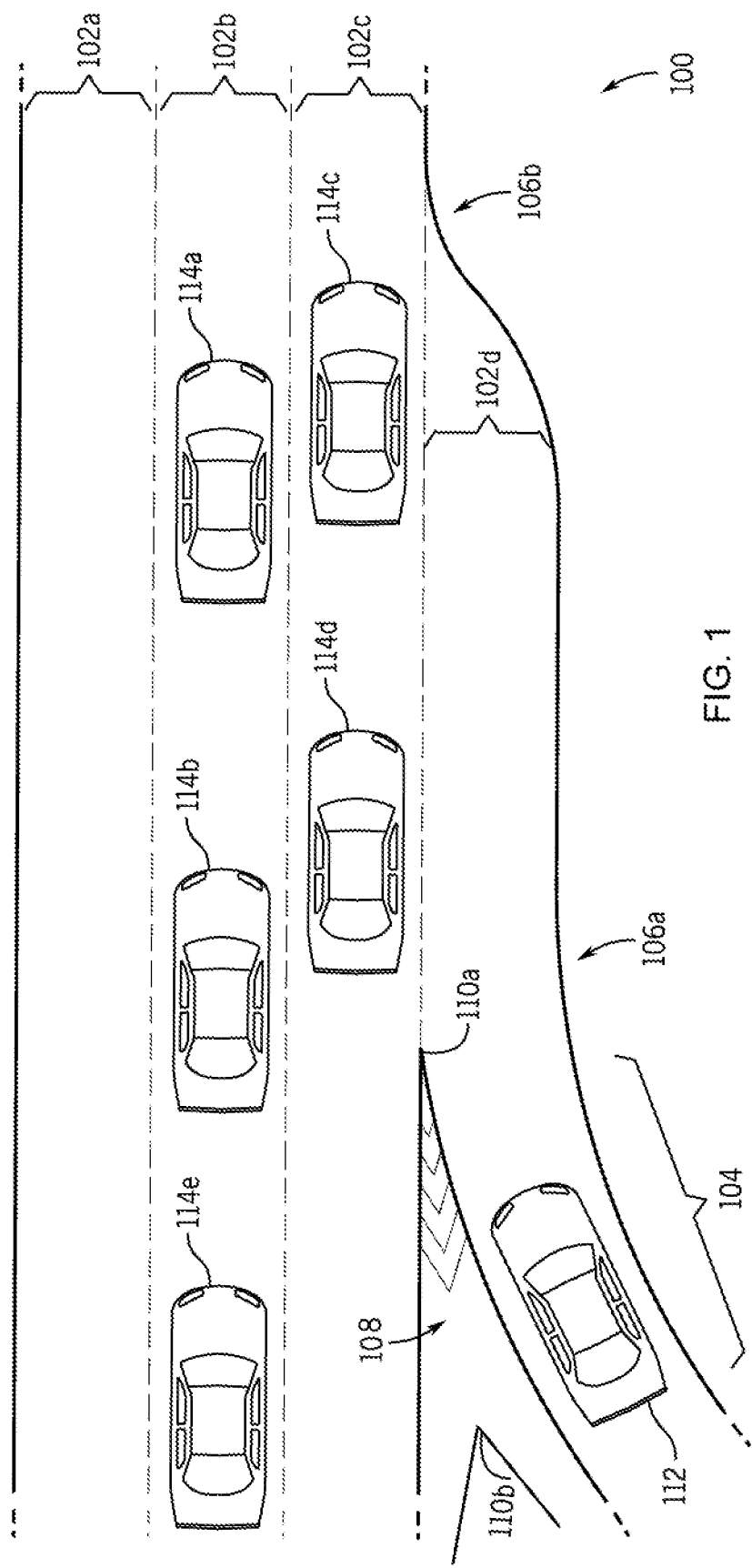
FIG. 1 is a schematic overhead view of a highway for describing an illustrative example implementing the methods and systems for automated merging according to one embodiment.

The following includes definitions of selected terms employed herein. The definitions include various examples and/or forms of components that fall within the scope of a term and that may be used for implementation. The examples are not intended to be limiting. Further, the components discussed herein, may be combined, omitted or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more computing devices (e.g., computer, personal digital assistant, cellular telephone, network device, vehicle, vehicle computing device, infrastructure device, roadside device) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. A database may be stored, for example, at a disk and/or a memory.

"Disk," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Operable connection," or a connection by which entities are "operably connected," is one in which signals, physical communications, and/or logical communications may be sent and/or received. An operable connection may include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may carry one or more human occupants. Further, the term "vehicle" may include vehicles that are automated or non-automated with pre-determined paths or free-moving vehicles.

"Vehicle control system," and/or "vehicle system," as used herein may include, but is not limited to, any automatic or manual systems that may be used to enhance the vehicle, driving, and/or security. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

Referring now to the drawings, wherein the showings are for purposes of illustrating one or more exemplary embodiments and not for purposes of limiting same, FIG. 1 is a schematic overhead view of a highway 100 that will be used to describe automated merging examples according to an exemplary embodiment. In FIG. 1, the highway 100 includes an inside lane 102a, a middle lane 102b, an outside lane 102c, and a merge lane 102d, however, it is understood that the highway 100 can have any number of lanes and/or different configurations other than those shown in FIG. 1. Further, in the embodiments discussed herein, the outside lane 102c is referred to as a main lane 102c.

In FIG. 1, the merge lane 102d has an on-ramp portion 104 where vehicles enter the highway 100. A gore 108 is an area that separates the on-ramp portion 104 of the merge lane 102d from the other highway lanes and helps control merge flow from the merge lane 102d to the main lane 102c. The tip of the gore 108 having chevron markings is referred as a soft nose 110a. The base of the gore 108 is referred to as a hard nose 110b. The merge lane 102d also has a taper begin area 106a and a taper end area 106b. Between the taper begin area 106a and the taper end area 106b, the merge lane 102d begins to narrow until the merge lane 102d ends, thereby controlling merge flow into the main lane 102c.

In FIG. 1, a merge vehicle 112 is travelling along the merge lane 102d. Additionally, a plurality of traffic actors 114 including a first traffic actor 114a, a second traffic actor 114b, a third traffic actor 114c, a fourth traffic actor 114d, and a fifth traffic actor 114e, are travelling along the highway 100. The methods and systems described herein, facilitate control of the merge vehicle 112 to perform a merge maneuver from the merge lane 102d to the main lane 102c.

Figure 2:
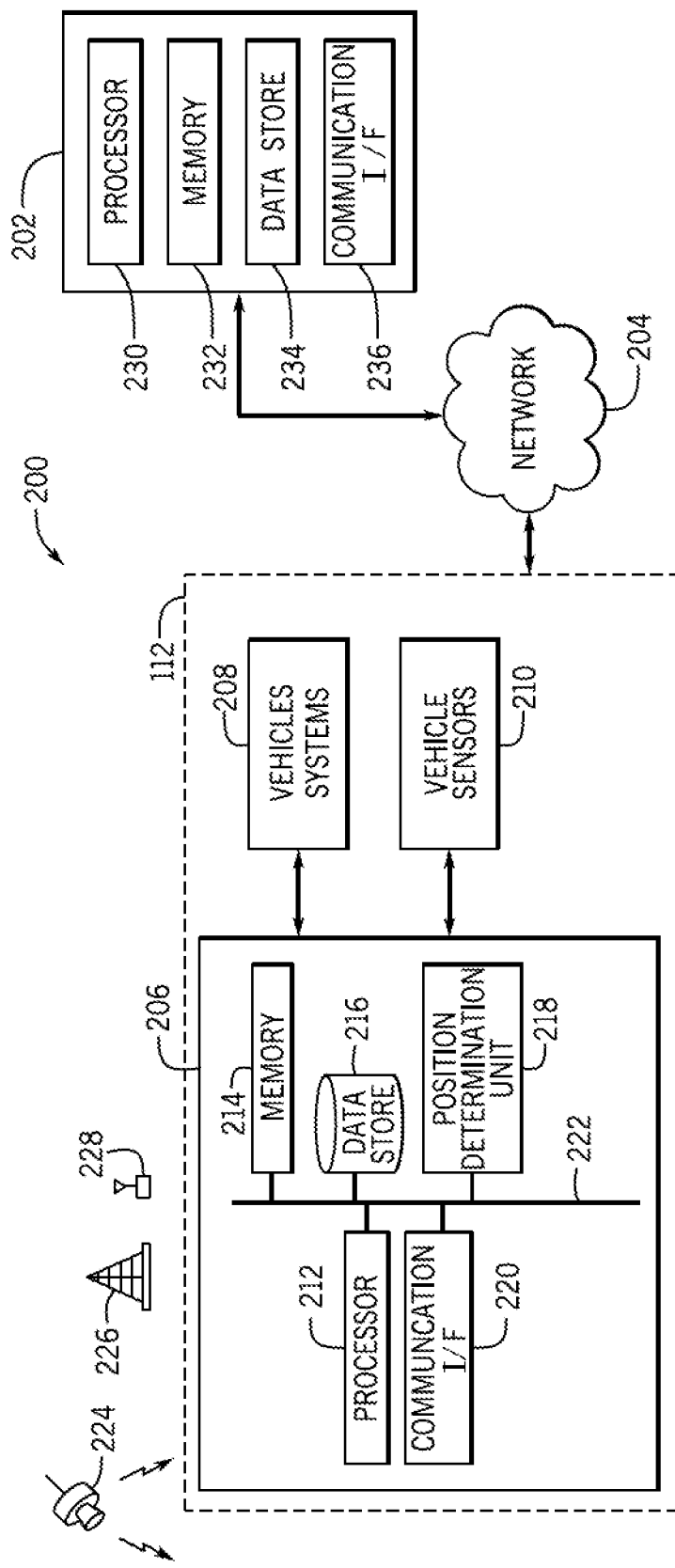
FIG. 2 is a block diagram of an exemplary system for automated merging according to one embodiment.

Referring now to FIG. 2, a block diagram of a system 200 for automated merging according to an exemplary embodiment is shown. FIG. 2 will be described with reference to one or more components of FIG. 1. The system 200 includes the merge vehicle 112, a traffic actor 114, and a remote server 202. It is understood that the components of the system 200, the merge vehicle 112, the traffic actor 114, the remote server 202, and the components of other systems, hardware architectures, and software architectures discussed herein, may be combined, omitted, or organized into different architectures for various embodiments.

As mentioned with FIG. 1, the traffic actor 114 includes road users in a surrounding environment of the merge vehicle 112. Although only one traffic actor 114 is shown in FIG. 2, it is understood that one or more of the traffic actors shown in FIG. 1 can be implemented with FIG. 2. In one embodiment, the merge vehicle 112, the traffic actor 114, and the remote server 202 are each operatively connected for computer communication using, for example, a network 204.

The merge vehicle 112 will now be discussed in detail, however, it is understood that the traffic actor 114 and/or the remote server 202 can include one or more of the components and/or functions discussed herein with respect to the merge vehicle 112. Thus, it is understood that although not shown in FIG. 2, one or more of the components of the merge vehicle 112, can also be implemented with and/or executed with the traffic actor 114, the remote server 202, and/or other devices not shown (e.g., portable devices, V2I devices, V2X devices) operable for computer communication with the system 200 and/or the merge vehicle 112.

In FIG. 1, the merge vehicle 112 includes a vehicle computing device (VCD) 206, vehicle systems 208, and vehicle sensors 210. Generally, the VCD 206 includes a processor 212, a memory 214, a data store 216, a position determination unit 218, and a communication interface (I/F) 220, which are each operably connected for computer communication via a bus 222 and/or other wired and wireless technologies discussed herein. The VCD 206 may include provisions for processing, communicating and interacting with various components of the merge vehicle 112 and other components of the system 200, including the traffic actor 114 and the remote server 202.

The processor 212 may include logic circuitry with hardware, firmware, and software architecture frameworks for facilitating control of the merge vehicle 112 including the automated merging and trajectory planning. Thus, in some embodiments, the processor 212 may store application frameworks, kernels, libraries, drivers, application program interfaces, among others, to execute and control hardware and functions discussed herein. In some embodiments, the memory 214 and/or the data store (e.g., disk) 216 may store similar components as the processor 212 for execution by the processor 212.

The position determination unit 218 may include hardware (e.g., sensors) and software to determine and/or acquire position data about the merge vehicle 112. For example, the position determination unit 218 may include a global positioning system (GPS) unit (not shown) and/or an inertial measurement unit (IMU) (not shown). Thus, the position determination unit 218 may provide a geoposition of the merge vehicle 112 based on satellite data from, for example, a global position unit 224, or from any Global Navigational Satellite infrastructure (GNSS), including GPS, Glonass (Russian) and/or Galileo (European). Further, the position determination unit 216 may provide dead-reckoning data or motion data from, for example, a gyroscope, accelerometer, magnetometers, among other sensors (not shown). In some embodiments, the position determination unit 218 may be a navigation system that provides navigation maps, map data, and navigation information to the merge vehicle 112.

The communication interface (I/F) 220 may include software and hardware to facilitate data input and output between the components of the VCD 206 and other components of the system 200. Specifically, the communication I/F 220 may include network interface controllers (not shown) and other hardware and software that manages and/or monitors connections and controls bi-directional data transfer between the communication I/F 220 and other components of the system 200 using, for example, the network 204. In particular, the communication I/F 220 may facilitate communication (e.g., exchange data and/or transmit messages) with the traffic actor 114, the remote server 202, and/or other devices, using any type of communication hardware and/or protocols discussed herein. For example, the computer communication may be implemented using a wireless network antenna 226 (e.g., cellular, mobile, satellite, or other wireless technologies), a road side equipment 228 (e.g., Dedicated Short Range Communications or other wireless technologies), and/or the network 204.

Referring again to the merge vehicle 112, the vehicle systems 208 may include any type of vehicle control system and/or system described herein to enhance the merge vehicle 112 and/or driving of the merge vehicle 112. For example, the vehicle systems 208 may include autonomous driving systems, driver-assist systems, adaptive cruise control systems, lane departure warning systems, merge assist systems, freeway merging, exiting, and lane-change systems, collision warning systems, integrated vehicle-based safety systems, and automatic guided vehicle systems, or any other advanced driving assistance systems (ADAS). As will be described herein, a 3D trajectory will be used to control one or more of the vehicle systems 208 to automatically merge the merge vehicle 112 into the main lane 102c.

For automated merging to operate effectively, dynamic data pertaining to the merge vehicle 112, the surrounding traffic actors 114, and the current and adjacent roads (e.g., the main lane 102c, the merge lane 102d) is required. The vehicle sensors 210, which may be implemented in whole and/or in part with the vehicle systems 208, may include various types of sensors for use with the merge vehicle 112 and/or the vehicle systems 208 for detecting and/or sensing this dynamic data. More specifically, the vehicle sensors 210 can sense a parameter of the merge vehicle 112, the vehicle systems 208, and/or an environment surrounding the merge vehicle 112. For example, the sensors 210 may provide dynamic data about the traffic actors 114 in proximity (e.g., in an environment surrounding) to the merge vehicle 112. The sensors 210 may also provide road information about the highway 100 including the main lane 102c and the merge lane 102d. For example, the road information can include geometry, condition, lane markings, lane measurements, lane coordinates, and longitudinal distances to an end of the merge lane 102d to and/or from the hard nose 110b, among others. Furthermore, in some embodiments, the vehicle systems 208 and/or the vehicle sensors 210 can be used for landmark detection of the taper begin area 106a, the taper end area 106b, the soft nose 110a, and the hard nose 110b, among others.

In one embodiment, the vehicle sensors 210 may include visions sensors (e.g., imaging devices, cameras) and/or ranging sensors (e.g., RADAR, LiDAR). However, it is understood that any type of sensor can be implemented. Further, it is understood that the sensors 210 may be disposed in one or more portions of the merge vehicle 112. For example, although not shown in FIG. 2, the sensors 210 could be integrated into a dashboard, seat, seat belt, door, bumper, front, rear, corners, dashboard, steering wheel, center console, roof or any other portion of the merge Referring again to the system 200, the remote server 202 may perform one or more of the components and/or functions described herein with the VCD 206. In FIG. 2, the remote server 202 includes a processor 230, a memory 232, a data sore 234, and a communication interface (I/F) 236. In one embodiment, the remote server 202 may receive merge data from the merge vehicle 112 and process the merge data according the methods described herein. Furthermore, the remote server 202 can also receive merge data from the merge vehicle 112 and/or the traffic actor 114 and process the merge data according to the methods described herein.

Figure 3:
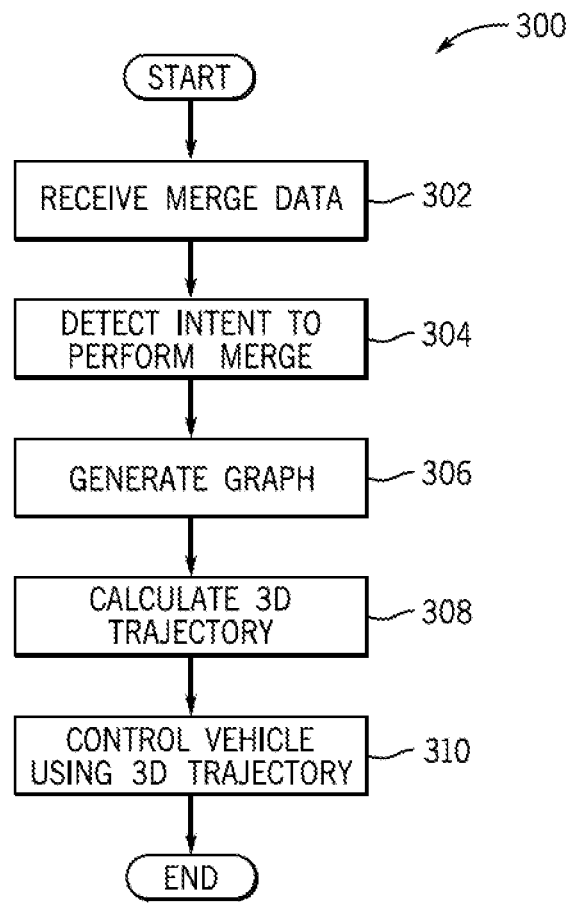
FIG. 3 is a process flow diagram of an exemplary method for automated merging according to one embodiment.

Referring now to FIG. 3, a method 300 for automated merging according to one embodiment will now be described. FIG. 3 will be described with reference to the components of FIGS. 1 and 2. At block 302, the method 300 includes receiving merge data about the merge vehicle 112 and a surrounding environment of the merge vehicle 112 including the merge lane 102d, the main lane 102c, and one or more traffic actors 114. Merge data, as used herein, can include data pertaining to: the merge vehicle 112, the traffic actors 114, and the highway 100 including the main lane 102c and the merge lane 102d. In some embodiments, the vehicle systems 208 and the vehicle sensors 210 can be used to capture merge data. In other embodiments, merge data can be received by the processor 212 from one or more traffic actors 114 (e.g., captured by systems and sensors for the traffic actors 114). In further embodiments, merge data can be retrieved by the processor 212 from the remote server 202 and/or connected infrastructures such as the RSE 228.

In one example, the merge data includes a position and a velocity (e.g., speed, heading) of the merge vehicle 112. In another example, the merge data includes a position, and a velocity (e.g., speed, heading), a length, and a width of the traffic actors 114 that are travelling in proximity to the merge vehicle 112 (e.g., travelling along the main lane 102c and/or the merge lane 102b). Furthermore, merge data can include data describing road geometry as discussed above and statistical traffic and/or behavior data (e.g., stored at the remote server 202).

At block 304, the method 300 includes detecting an intent to perform a merge maneuver by the merge vehicle 112 from the merge lane 102d to the main lane 102c. An indication that there is an immediately adjacent main lane (e.g., the main lane 102c) for which to merge into is an activation criterion to begin graph construction and trajectory search. In many situations, this indication is provided by the hard nose 110b. For example, in one embodiment, detecting the intent to perform the merge maneuver includes the processor 212 detecting a hard nose landmark (e.g., the hard nose 110b) separating the merge lane 102d from the main lane 102c based on the merge data. As mentioned above, the vehicle systems 208 and/or the vehicle sensors 210 can be used for landmark detection of the hard nose. In some embodiments, detection of the intent to perform the merge maneuver must be made at least 200 m prior to the hard nose 110b giving enough time for a comfortable handoff.

At block 306, the method 300 includes generating a graph having a plurality of nodes connected by edges. The plurality of nodes includes a start node set to a current position of the merge vehicle 112 and a goal node located in the main lane 102c after the merge lane 102d has ended (e.g., beyond the taper end area 106b and in the main lane 102c). In some embodiments, the goal node includes one or more points (e.g., goal positions) in the main lane 102c after the merge lane 102d has ended (e.g., beyond the taper end area 106b and in the main lane 102c). In one embodiment, generating the graph includes setting a zero point of the graph to a position of the merge vehicle 112 when the intent to perform the merge maneuver is detected at block 304.

Figure 6:
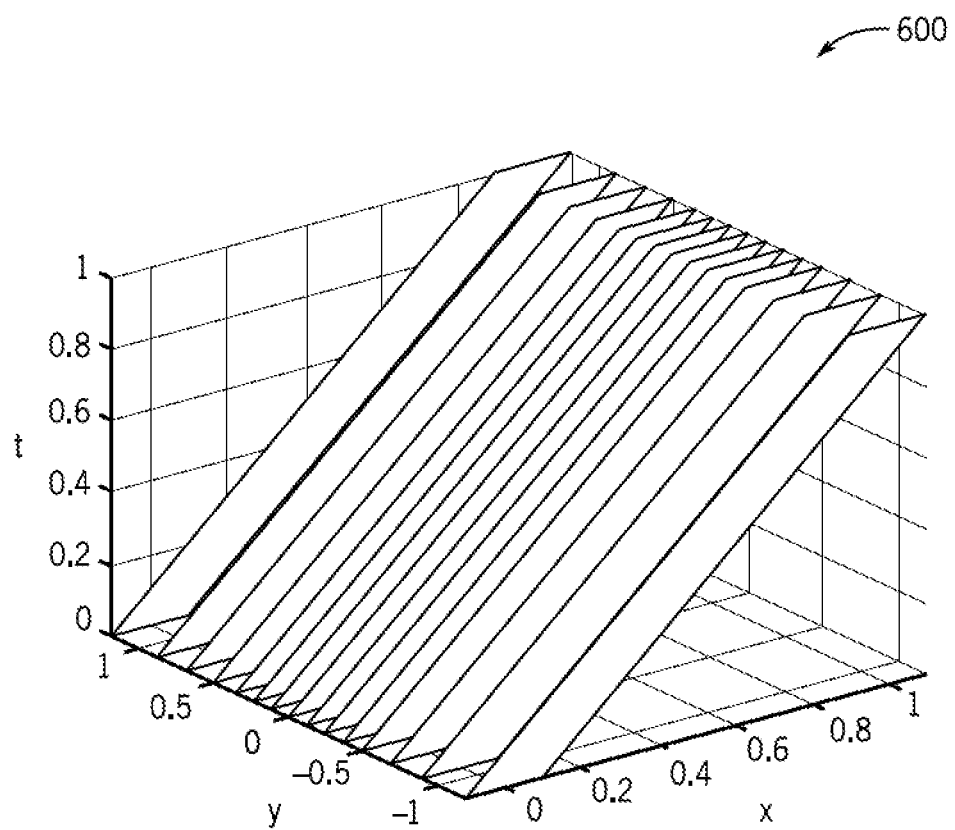
FIG. 6 is a graph showing distribution of graph nodes in three-dimensions according to an exemplary embodiment.

The processor 212 constructs the graph in three-dimensions: longitudinal position, lateral position, and time (X,Y, T). A pre-defined number of nodes are put into the graph with rectilinear spacing. The density of nodes is non-linear, with eccentricity terms in each X-Y plane that clusters more nodes in the center of the graph layer to provide more options to the default (central) path in the graph. The boundaries of each graph layer are also parameterized and can be varied by the user. An example three-dimensional node distribution is shown in graph 600 of FIG. 6.

Figure 7:
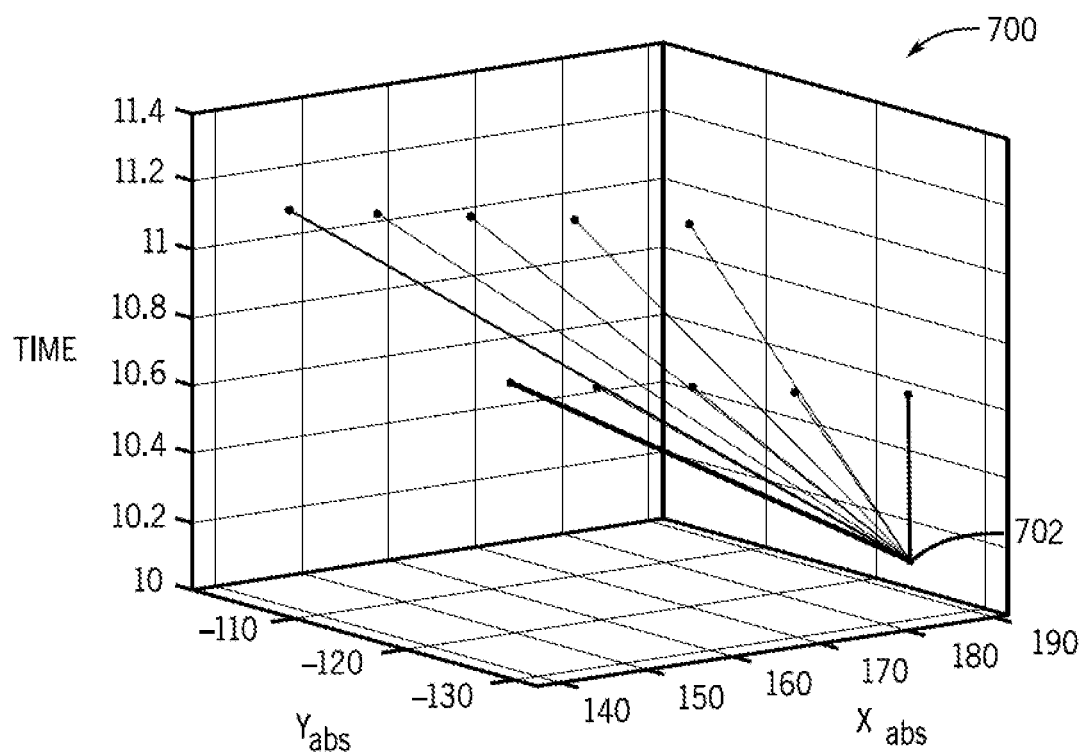
FIG. 7 is a graph showing a graph node with ten directed edges connecting the note to other nodes according to an exemplary embodiment.

Layers of nodes are assembled according to time step layers. The nodes of each layer are connected by directed graph edges to nearby nodes one or more time steps above, and user-defined parameters control the connections and the neighborhood (collection of nodes) that is reachable from each node. FIG. 7 illustrates a graph 700 with ten directed edges connecting the note to other nodes according to an exemplary embodiment. In particular, in FIG. 7, a node 702 is connected to five nodes in the next layer and to another five nodes in the layer above that. In practice, it is recommended to have connections only between adjacent layers, unless the node density in the temporal dimension is very high.

Figure 8A:
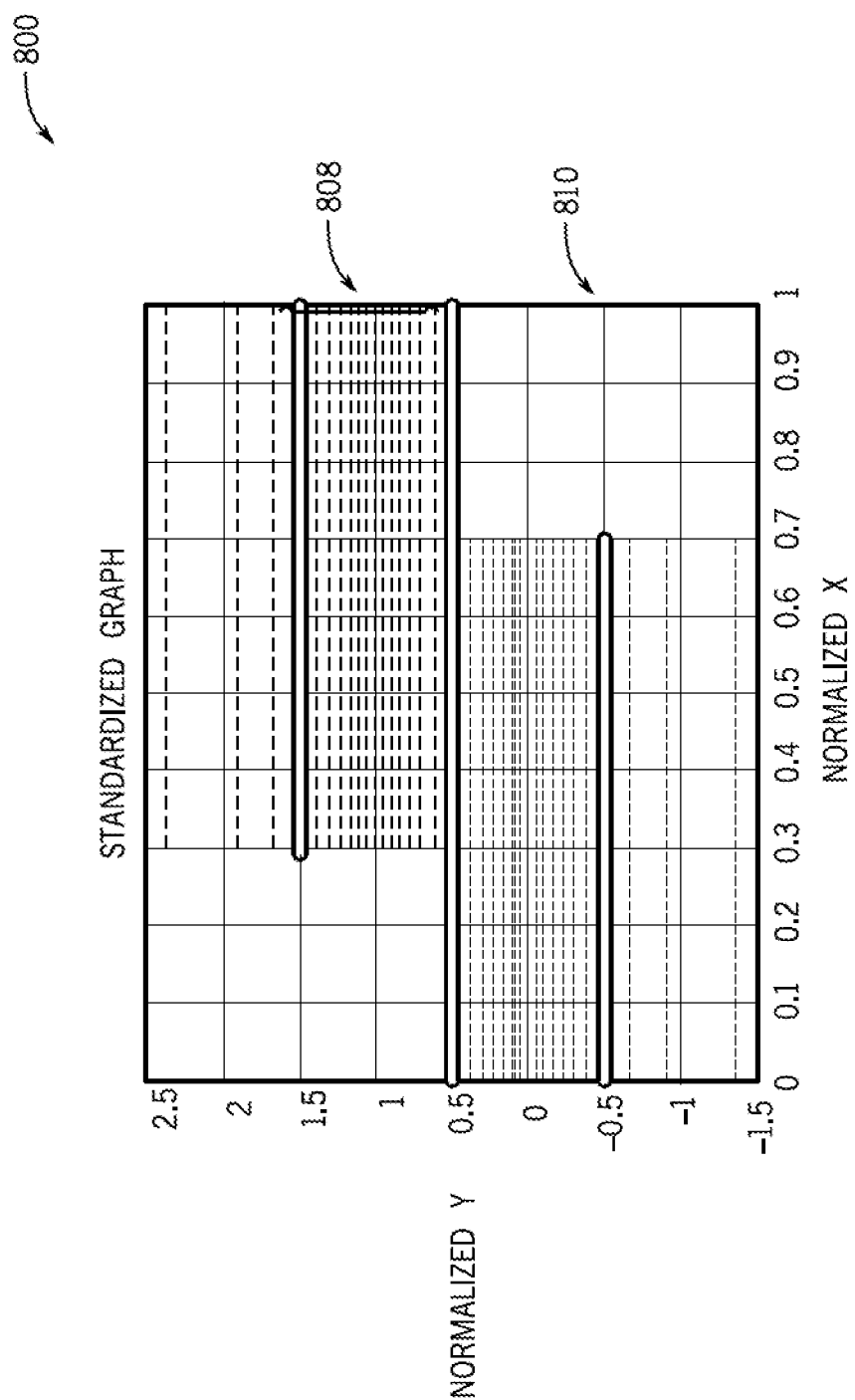
FIG. 8A is a standardized graph structure according to an exemplary embodiment.

The graph is built using a standardized graph structure with node coordinates based in both standard and real space. The standardized node coordinates are meant to generalize the highway merging problem shown in FIG. 1 and convert a merge area (e.g., the main lane 102c, the merge lane 102d) into unit-less dimensions. FIG. 8A illustrates a standardized graph 802. In FIG. 8A, an area 808 represents nodes located on the main lane 102c, and an area 810 represents nodes located in the merge lane 102d. The X values for the hard nose 110b and taper end area 106b are 0.3 and 0.7, respectively. The high longitudinal density of the nodes causes the nodes to look like straight lines. Laterally, each lane is 1 unit wide and centered on integer values. For example, the merge lane 102d center is located at 0 and the main lane 102c center is located at 1. The longitudinal position is defined as 0 at 1 second before the hard nose 110b and is 1 at 50 m after the taper end area 106b at the end of the merge lane 102d.

The road information (e.g., the merge data about the surrounding environment of the merge vehicle 112) is used to interpolate the standardized nodes into absolute, real-world positions. As mentioned above, the road information includes information about road geometry of the highway 100, as well as positions of road landmarks (e.g., the taper begin area 106a, the taper end area 106b, the soft nose 110a, and the hard nose 110b). In the absence of perfect knowledge, the road geometry can be estimated based on sections of the highway 100 that is observable by the vehicle sensors 210 of the merge vehicle 112. For the landmark positions, statistical or otherwise predefined data can be used. If the merge vehicle 112 has traveled from the hard nose 110b to a distance that exceeds the prescribed distance to a landmark without the corresponding landmark detection, then the road geometry estimation is updated because all undetected landmarks must be in front of the merge vehicle 112.

Figure 8B:
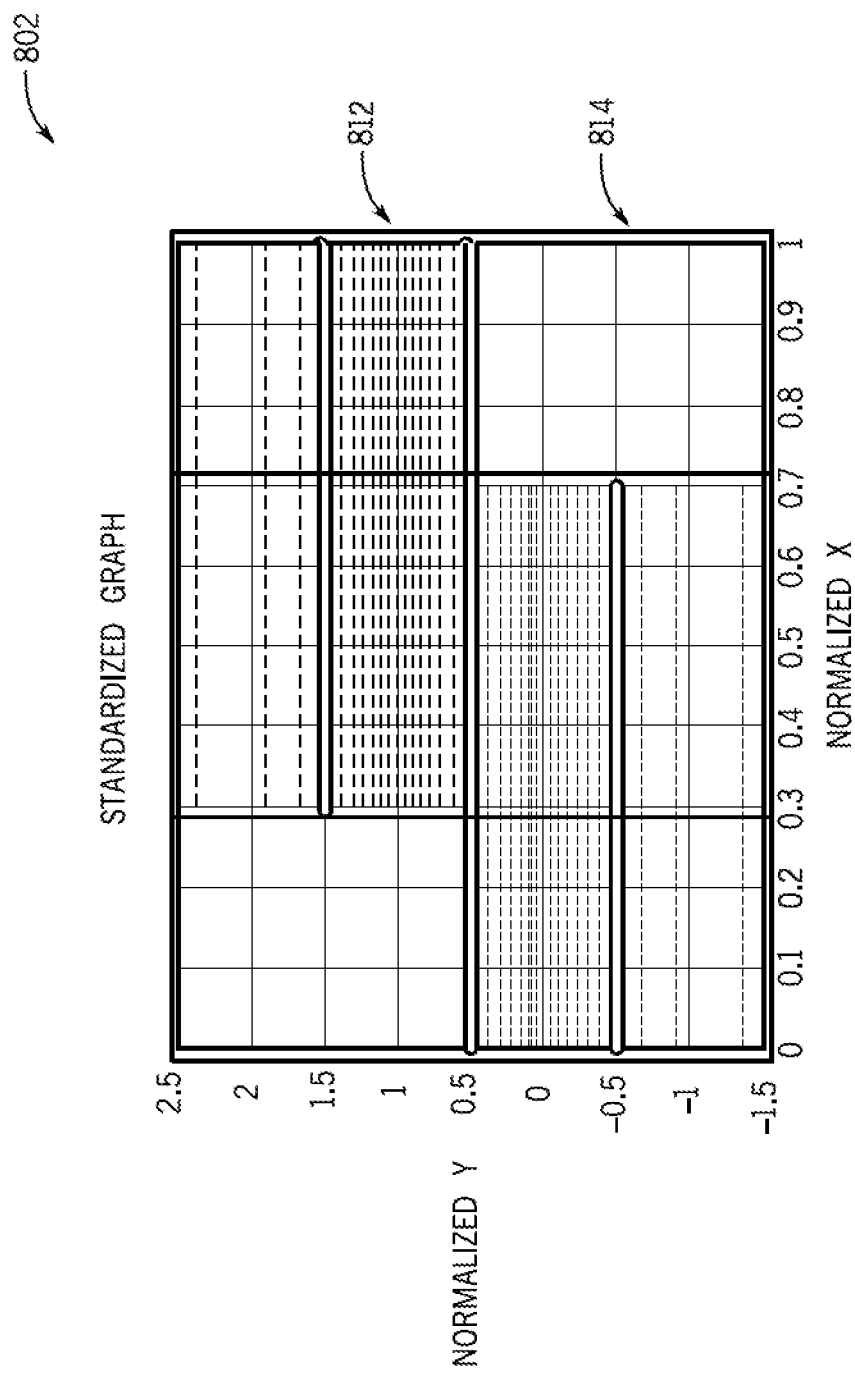
FIG. 8B illustrates a transformation from standardized coordinates to absolute coordinates of the standardized graph of FIG. 8A according to an exemplary embodiment.
Figure 8C:
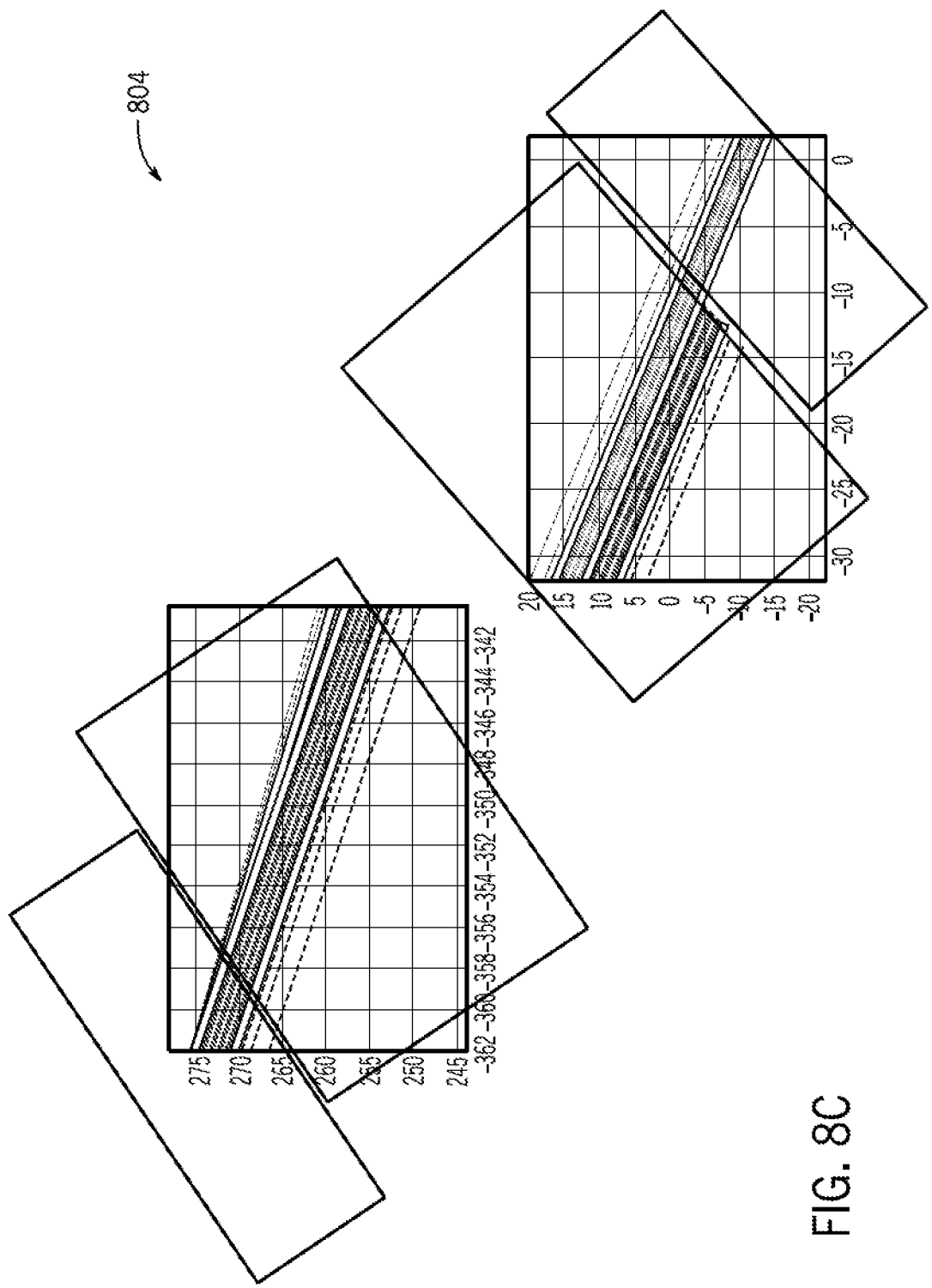
FIG. 8C illustrates a transformation from absolute coordinates to standardized coordinates of the standardized graph of FIG. 8A according to an exemplary embodiment.
Figure 9:
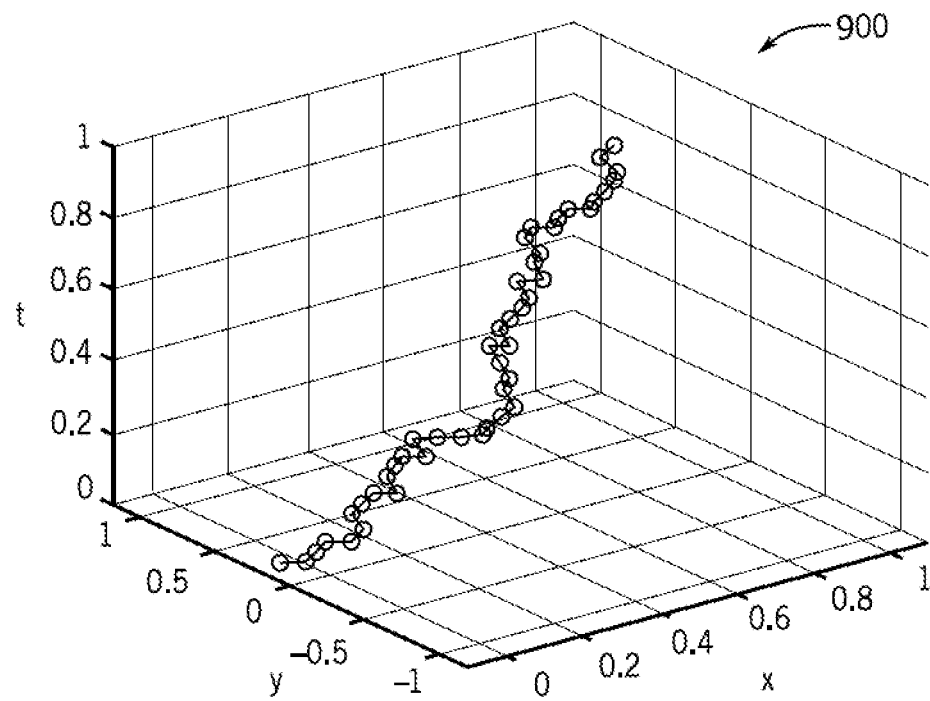
FIG. 9 is a graph showing a minimum-cost trajectory for a graph that has random edge costs according to an exemplary embodiment.

The predefined distances between the landmarks can be configured or set as default values. For example, the distance from the hard nose 110b to the soft nose 110a is set to 100 meters, the distance from the soft nose 110a to the taper end area 106b is set to 250 meters, and the length of the taper (e.g., between the taper begin area 106a and the taper end area 106b) is set to 80 m. As mentioned above, every node in the graph is associated with standardized coordinates as well as absolute coordinates. The relationship between the coordinate systems is updated at a specified rate. FIGS. 8B and 8C illustrate the relationship between these two coordinate systems. FIG. 8B illustrates a graph 802 showing a transformation from standardized coordinates to absolute coordinates. FIG. 8C, illustrates a graph 804 showing a transformation from absolute coordinates to standardized coordinates. As can be seen, in the standardized graph 802 the vehicles always move toward positive X direction, whereas in absolute coordinates shown in graph 804 the orientation of the road can be arbitrary.

Referring again to FIG. 3, at block 308, the method 300 includes calculating a three-dimensional (3D) trajectory based on the graph using cost estimation by optimizing edge costs (e.g., a minimum cost path in the X, Y, T space) of the graph from the start node to the goal node. Said differently, the processor 212 calculates the 3D trajectory as a path between the start node and the goal node having a lowest total cost. In some embodiments, a total cost for each path between the start node and the one or more goal positions (e.g., the goal node is calculated. The processor 212 can then select the path with the lowest total cost. Accordingly, the 3D trajectory, which starts from a current position of the merge vehicle 112 at a current time and ends in a single goal point, typically located in the middle of the main lane 102c after the merge lane 102b has ended (e.g., after the taper end area 106b and in the main lane 102c), at some future time.

As mentioned above, every edge in the graph is associated with a cost that can be between zero and infinity. The graph costs can include, but are not limited to, lane keep cost, merge lane base cost, merge lane end cost, persistence cost radii, persistence cost values, maximum persistence cost, speed cost, maximum speed cost, pseudo-acceleration cost, costs around traffic actors 114, traffic actors 114 cost distances, traffic object buffer distances, buffer times, buffer cost values, relative speed cost, minimum traffic speed cost, adjacency cost, adjacency width, gap cost, minimum time gap cost, and behavioral cost function. As will be discussed herein in further detail, every time a new 3D trajectory is calculated, the costs and the graph are updated using the most recent sensor data (e.g., merge data).

Once the graph with up-to-date costs is available, the 3D trajectory (e.g., an optimal trajectory) is calculated by the processor 212 from the start node to the goal node as described above. FIG. illustrates a graph 900 showing a 3D trajectory (e.g., an optimal path) corresponding to FIG. 6 and random edge costs. As mentioned above, the start node is always the current position of the merge vehicle 112. The goal node contains several nodes that are located after the end of the taper end area 106b and in the main lane 102c.

At block 310, the method 300 includes controlling the merge vehicle 112 using the 3D trajectory. For example, control of the merge vehicle 112 is implemented according to the 3D trajectory to control motion of the merge vehicle 112 to complete the merge maneuver. In one embodiment, block 310 includes determining an actual trajectory based on absolute coordinate values of each node included in the 3D trajectory and controlling the merge vehicle 112 based on the actual trajectory. Said differently, the processor 212 determines an actual trajectory based on the 3D trajectory by converting the 3D trajectory to absolute coordinate values, and the processor 212 transmits the actual trajectory to the merge vehicle. This causes the processor 212 to control the merge vehicle 112 according to the motion control signals to complete the merge maneuver.

Typically, the output is a trajectory that is passed to low-level controllers of the merge vehicle 112. Accordingly, in some embodiments, the processor 212 filters the trajectory to reduce erratic behavior and then passes the trajectory to one or more vehicle systems 208, for example, a throttle controller, a brake controller, and/or a steering controller (not shown). In one embodiment, the trajectory is used by a longitudinal velocity controller (not shown) that provides throttle and brake commands to an engine (not shown) of the merge vehicle 112. In another embodiment, a lateral controller (not shown) provides a steering wheel angle to the engine of the merge vehicle 112 based on the trajectory.

Figure 10:
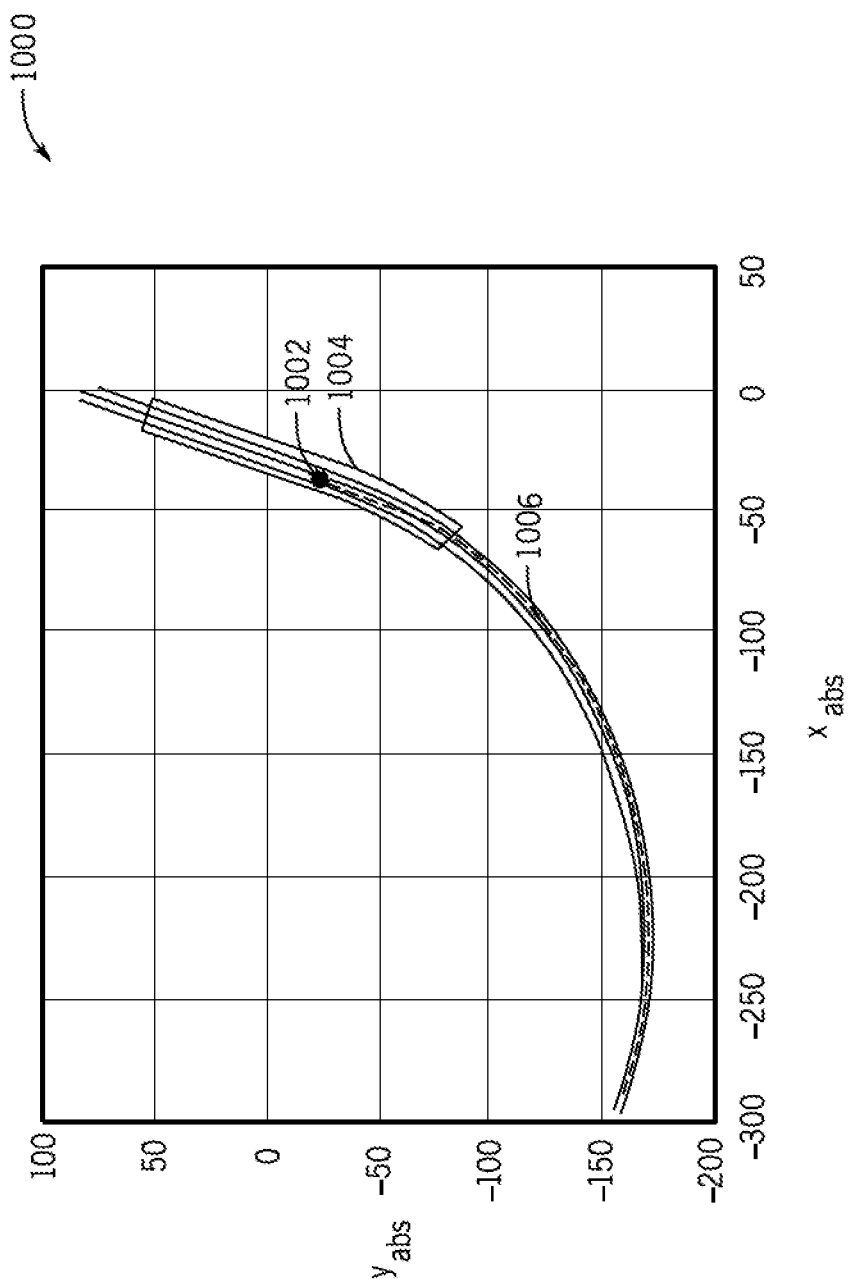
FIG. 10 is a graph showing a solved trajectory in absolute coordinates and projected onto a two-dimensional plane according to an exemplary embodiment.
Figure 11:
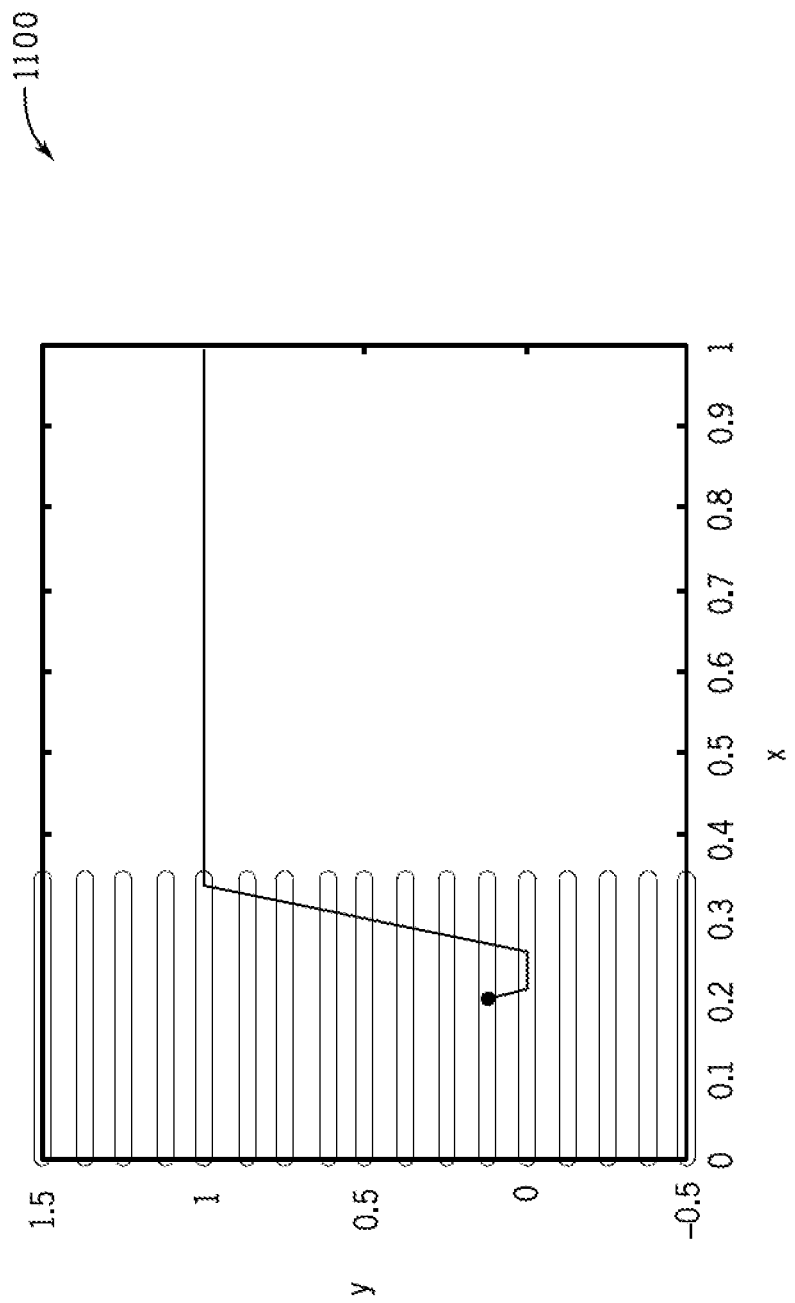
FIG. 11 is a graph showing a solved trajectory in standard coordinates and projected onto a two-dimensional plane according to an exemplary embodiment.

FIG. 10 illustrates a solved trajectory (e.g., actual trajectory) in the X-Y plane of a graph 1000. The current position (i.e., the start node) of the merge vehicle 112 is denoted by a black dot 1002, and a box area 1004 surrounding the merge vehicle 112 represents the location of graph nodes in the first (i.e., current) time layer. A dotted line curve 1006, which ends at the goal node, is the trajectory, and the black solid lines denote the estimated edges of the main lane 102c and the merge lane 102d. In this example, the merge maneuver from the merge lane 102d to the main lane 102c happens relatively quickly. A graph 1100 in FIG. 11 shows the same situation shown in the graph 1000 but in standardized coordinates. Traveling in the middle of the main lane is seen as a straight horizontal line in FIG. 11, although the actual real-world trajectory (i.e., the dotted line curve 1006) is curved as shown in FIG. 10.

Figure 4:
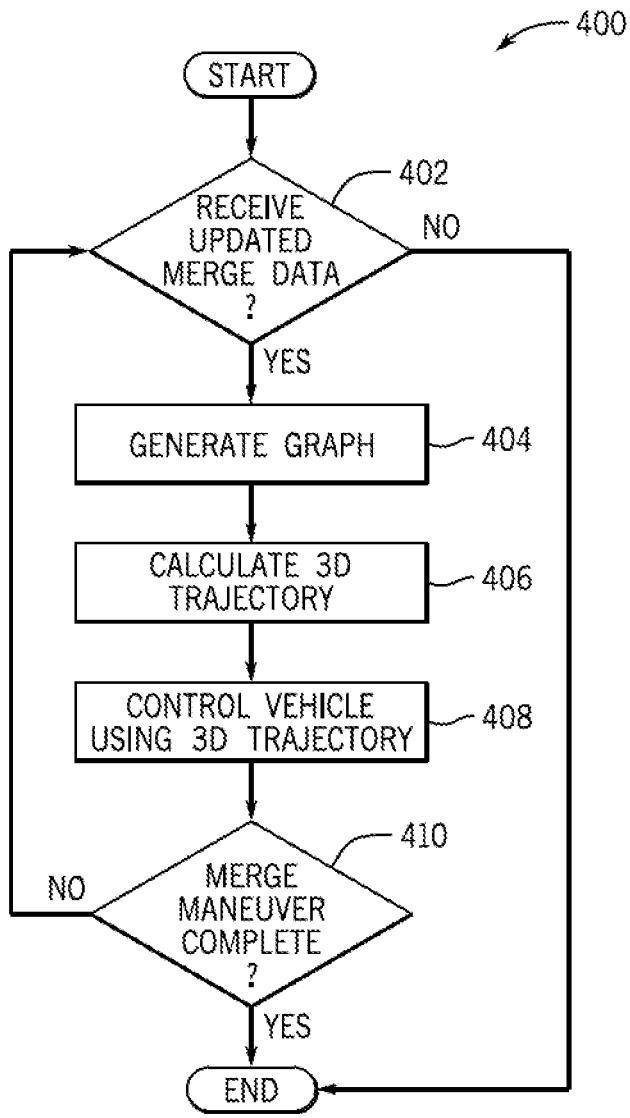
FIG. 4 is a process flow diagram of another exemplary method for automated merging according to one embodiment.

As mentioned above, a new 3D trajectory is calculated when updated merge data is captured and/or received. Accordingly, a series of 3D trajectories are computed when updated merge data is available and the merge maneuver has not been completed. This process will now be described with reference to FIG. 4, which is a process flow diagram of a method 400 for automated merging according to one embodiment. FIG. 4 will be described with reference to one or more of the components of FIGS. 1-3. At block 402, the method 400 includes determining whether updated merge data has been received. Alternatively, block 402 can include determining whether to capture updated merge data. In some embodiments, updated merge data is automatically received by the processor 212 as the merge vehicle 112 changes positions and/or as new road information (e.g., merge data about the environment surrounding the merge vehicle 112 including the main lane 102c and the merge lane 102d) becomes available.

At block 404, the method 400 includes updating the graph. In one embodiment, updating the graph includes the processor 212 updating the start node based on a current position and a current heading of the merge vehicle 112 relative to the zero point. Said differently, upon receiving the updated merge data at block 402, the processor 212 updates the graph by updating the start node based on a current position and a current heading of the merge vehicle 112 relative to a position of the merge vehicle stored upon detecting the intent to perform the merge maneuver (e.g., a block 304 of the method 300). In one embodiment, a graph update rate (e.g., 1 Hz) is used to determine how often a new graph is created based on the updated road information and the updated position of the merge vehicle 112. Creation of the graph can change the topology of the graph (i.e., which nodes are connected to each other), as well as the coordinate information encoded in the nodes. A higher rate increases the computational cost, but can result in more accurate numerical description of the problem and therefore more feasible output from the algorithm. In particular, a higher rate means that the information from sensors (e.g., the vehicle sensors 210) is read more frequently. This can significantly improve the quality of the algorithm output in cases where the estimation of the road geometry is purely based on sensor data.

At block 406, the method 400 includes calculating a new 3D trajectory. In one embodiment, a trajectory update rate (e.g., 4 Hz) is used to determine how often the costs in the graph are updated and a new trajectory is solved. Higher rates increase the overall computation time, but result in trajectories that take into account the more recent sensor data. In practice, the trajectory update rate should be equal or greater than the graph update rate. Otherwise, the graph is being updated, which is computationally expensive, but the updated graph is not used to update the trajectory.

At block 408, the method 400 includes controlling the merge vehicle 112 using the new 3D trajectory. For example, as described above with block 310 of FIG. 3, the processor can determine an actual trajectory based on the 3D trajectory by converting the 3D trajectory to absolute coordinate values. The processor 212 transmits the actual trajectory to the merge vehicle 112 for control as described herein.

At block 410, the method 400 includes determining if the merge maneuver has been completed. In one example, a merge maneuver begins when the merge vehicle 112 is within 0.1 units from a center of the merge lane 102d. The merge maneuver ends when the merge vehicle 112 is within 0.1 units from a center of the main lane 102c. This determination can be based on updated merge data including a position of the merge vehicle 112 and a current time. In another embodiment, it is determined if the merge vehicle 112 has reached a center of the main lane 102c. If the determination is YES at block 410, the method 400 ends since there is no need to continue computing trajectories. If the determination is no at block 410, further trajectories are computed by the method 400 by proceeding to check for updated merge data at block 402.

Figure 5:
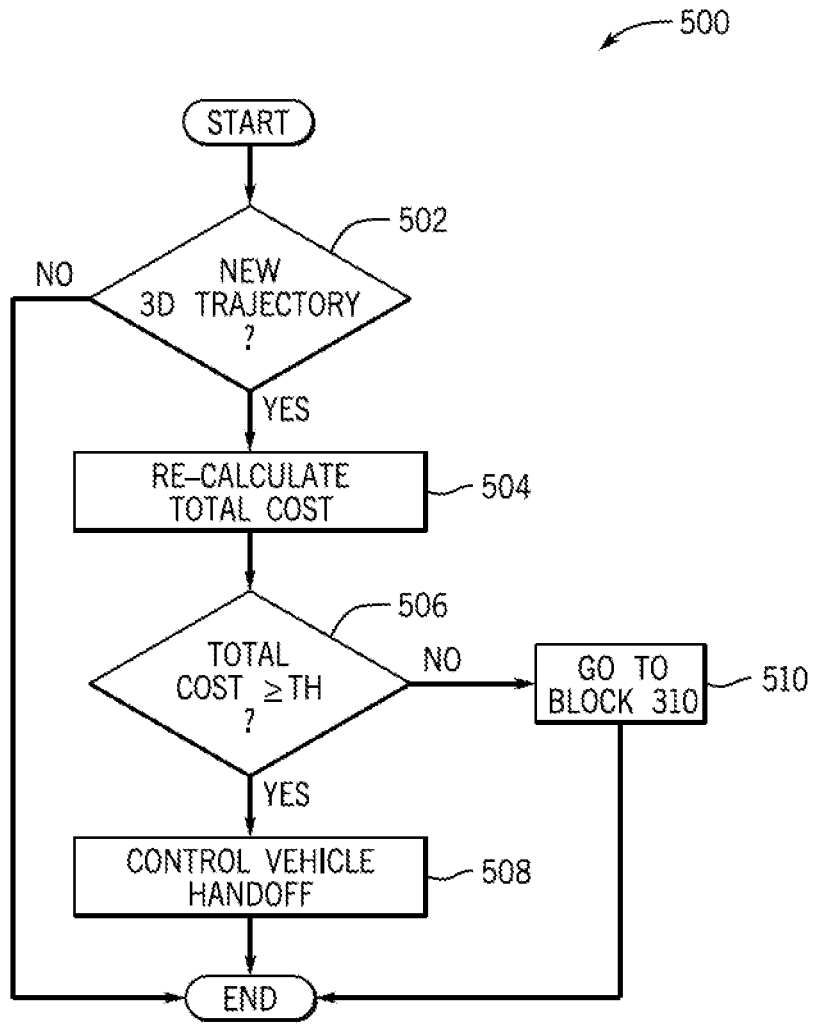
FIG. 5 a process flow diagram of a further exemplary method for automated merging including a handoff decision according to one embodiment.

Every time a new 3D trajectory is computed, the total cost of the new trajectory is obtained along the trajectory itself. A high cost could mean, for example, that even the optimal trajectory requires very high or low speeds or driving very close to other traffic objects. When deciding whether to continue relying on automated merging or handing off the control to a vehicle occupant (not shown) of the merge vehicle 112, a threshold for the total cost can be used. Accordingly, referring now to FIG. 5, a method 500 for automated merging according to one embodiment will now be described. At block 502, the method 500 includes determining if a new 3D trajectory has been calculated and/or determined. For example, block 502 can be implemented with block 406 of FIG. 400. At block 504, the method 500 includes re-calculating the total cost of the new 3D trajectory. For example, as described above with FIG. 406. Furthermore, at block 506, the method 500 includes determining if the total cost is greater than or equal to a predetermined threshold th. The predetermined threshold th can be stored at the merge vehicle 112 and/or the remote server 202.

If the determination at block 506 is YES, the method 500 continues to block 508, where the merge vehicle 112 is controlled to stop automated merging and handoff vehicle control to a vehicle occupant (not shown). If the determination at block 506 is NO, the method 500 returns to block 310 of the method 300 and/or the block 408 of the method 400, where the merge vehicle 112 is controlled according to the new 3D trajectory. Ideally, the handoff decision should be made at or before hard nose 110*b* to avoid handoff in the middle of a merge maneuver. Accordingly, in addition to the threshold check at block 506, the processor can determine a position of the merge vehicle 112 with respect to the hard nose 110*b*. It is understood that other criteria for the handoff can also be implemented. For example, a number of traffic actors 114 in the main lane 102*c*. By combining the two handoff criteria, one for the initial cost and another for the number of traffic actors 114, the overall performance of the automated merge and the handoff decision can be improved. For example, if a predetermined threshold (th) of 107,000 is chosen for the initial cost, and the automated merge is only executed where there are four or less objects in the main lane, the overall success rate of the remaining simulations increases to approximately 93%.

The embodiments discussed herein can also be described and implemented in the context of "computer-readable medium" or "computer storage medium." As used herein, "computer-readable medium" or "computer storage medium refers to a non-transitory medium that stores instructions, algorithms, and/or data configured to perform one or more of the disclosed functions when executed. Computer-readable medium can be non-volatile, volatile, removable, and non-removable, media implemented in any method or technology for storage of information such as computer readable instructions, data structures, modules or other data. Computer-readable medium can include, but is not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can interface with. Computer-readable medium excludes non-transitory tangible media and propagated data signals.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for controlling a merge vehicle travelling along a highway having a merge lane and a main lane, comprising:
   receiving merge data about the merge vehicle and a surrounding environment of the merge vehicle including the merge lane, the main lane, and one or more traffic actors;
   detecting an intent to perform a merge maneuver by the merge vehicle from the merge lane to the main lane based on the merge data, wherein detecting the intent to perform the merge maneuver includes detecting a hard nose landmark separating the merge lane from the main lane based on the merge data;
   generating a graph having a plurality of nodes connected by edges, wherein the plurality of nodes includes a start node set to a current position of the merge vehicle and a goal node located in the main lane after the merge lane has ended, the plurality of nodes are associated with standardized coordinates and absolute coordinates, and the standardized coordinates are interpolated into the absolute coordinates using the merge data about the surrounding environment of the merge vehicle;
   calculating a three-dimensional (3D) trajectory based on the graph by optimizing edge costs from the start node to the goal node; and
   controlling the merge vehicle based on the 3D trajectory.

2. The computer-implemented method of claim 1, wherein generating the graph includes the graph having three axes including a longitudinal axis, a lateral axis and time and one of the dimensions in the 3D trajectory is time.

3. The computer-implemented method of claim 1, wherein generating the graph includes setting a zero point of the graph to a position of the merge vehicle when the intent to perform the merge maneuver is detected.

4. The computer-implemented method of claim 3, including receiving updated merge data and upon receiving the updated merge data, updating the graph, calculating a new 3D trajectory based on the graph, and optimizing edge costs includes calculating a total cost of the new 3D trajectory.

5. The computer-implemented method of claim 4, wherein updating the graph includes updating the start node based on a current position and a current heading of the merge vehicle relative to the zero point.

6. The computer-implemented method of claim 1, wherein the goal node includes one or more goal positions located in the main lane after an end of the merge lane, and optimizing edge costs includes calculating a total cost for each path between the start node and the one or more goal positions.

7. The computer-implemented method of claim 6, wherein the 3D trajectory is a path between the start node and the goal node having a lowest total cost.

8. The computer-implemented method of claim 1, wherein controlling the merge vehicle based on the 3D trajectory includes determining an actual trajectory based on absolute coordinate values of each node included in the 3D trajectory and controlling the merge vehicle based on the actual trajectory.

9. The computer-implemented method of claim 1, wherein controlling the merge vehicle based on the 3D trajectory includes controlling motion of the merge vehicle based on the 3D trajectory to complete the merge maneuver.

10. A system for controlling a merge vehicle travelling along a highway having a merge lane and a main lane, comprising:
   a plurality of sensors for capturing merge data about the merge vehicle and a surrounding environment of the merge vehicle including the merge lane, the main lane, and one or more traffic actors; and
   a processor operatively connected for computer communication with the plurality of sensors, wherein the processor:
   detects an intent to perform a merge maneuver by the merge vehicle from the merge lane to the main lane based on the merge data;
   generates a graph having a plurality of nodes connected by edges, wherein the plurality of nodes includes a start node set to a current position of the merge vehicle and a goal node located in the main lane after the merge lane has ended, the plurality of nodes are associated with standardized coordinates and absolute coordinates, and the standardized coordinates are interpolated into the absolute coordinates using the merge data about the surrounding environment of the merge vehicle;

calculates a three-dimensional (3D) trajectory based on the graph by optimizing edge costs from the start node to the goal node;

transmits the 3D trajectory to the merge vehicle thereby controlling the merge vehicle to perform the merge maneuver according to the 3D trajectory; and controls the merge vehicle based on the 3D trajectory.

11. The system of claim 10, wherein the processor optimizes the edge costs by selecting a path having a lowest total cost and calculates the 3D trajectory based on the path having the lowest total cost.

12. The system of claim 10, wherein the processor calculates a new 3D trajectory upon receiving updated merge data.

13. The system of claim 12, wherein upon receiving the updated merge data, the processor updates the graph by updating the start node based on a current position and a current heading of the merge vehicle relative to a position of the merge vehicle stored upon detecting the intent to perform the merge maneuver.

14. The system of claim 10, wherein the processor determines an actual trajectory based on the 3D trajectory by converting the 3D trajectory to absolute coordinate values, and the processor transmits the actual trajectory to the merge vehicle.

15. The system of claim 10, wherein detecting an intent to perform a merge maneuver by the merge vehicle includes detecting a hard nose landmark as the intent to perform the merge maneuver.

16. A non-transitory computer-readable storage medium including instructions that when executed by a processor, cause the processor to:

receive merge data about a merge vehicle and a surrounding environment of the merge vehicle including a merge lane, a main lane, and one or more traffic actors;

detect an intent to perform a merge maneuver by the merge vehicle from the merge lane to the main lane based on the merge data;

detect a hard nose landmark as the intent to perform the merge maneuver;

generate a graph having a plurality of nodes connected by edges, the graph having three axes corresponding to longitudinal position, lateral position and time, wherein the plurality of nodes includes a start node set to the current position of the merge vehicle and a goal node located in the main lane after the merge lane has ended, the plurality of nodes are associated with standardized coordinates and absolute coordinates, and the standardized coordinates are interpolated into the absolute coordinates using the merge data about the surrounding environment of the merge vehicle;

calculate a three-dimensional (3D) trajectory based on the graph by optimizing edge costs from the start node to the goal node;

communicate motion control signals to the merge vehicle based on the 3D trajectory; and control the merge vehicle according to the motion control signals to complete the merge maneuver.

17. The non-transitory computer-readable storage medium of claim 16, including causing the processor to set a zero point of the graph to a position of the merge vehicle when the intent to perform the merge maneuver is detected.

18. The non-transitory computer-readable storage medium of claim 16, including causing the processor to capture updated merge data, update the graph based on the updated merge data, and calculate a new 3D trajectory based on the graph.

19. The non-transitory computer-readable storage medium of claim 18, wherein updating the graph includes updating the start node based on a current position and a current heading of the merge vehicle relative to a zero point of the graph.

* * * * *